Nov. 6, 1951 T. WHEATLEY 2,574,428
VALVE ASSEMBLY
Filed Nov. 15, 1948 2 SHEETS—SHEET 1
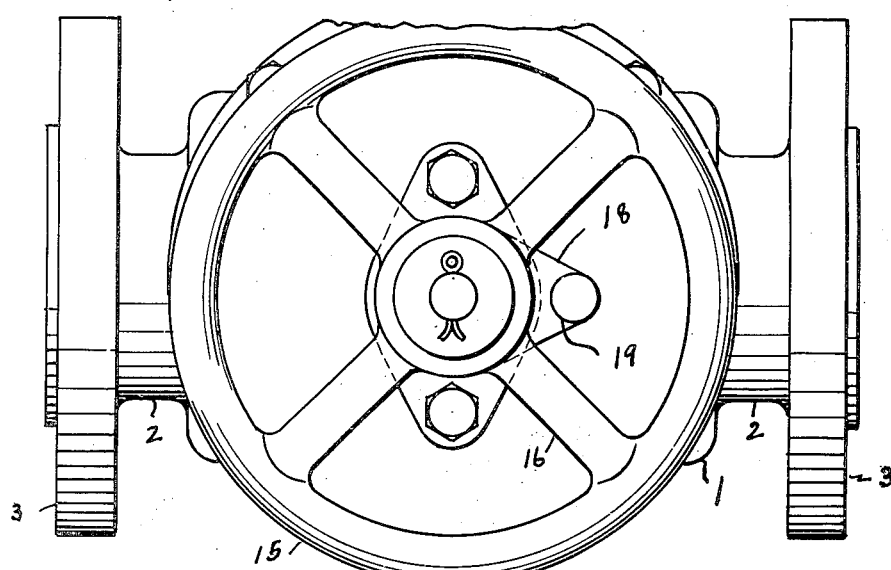
Fig.2.
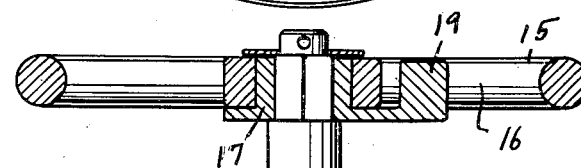
Fig.1.
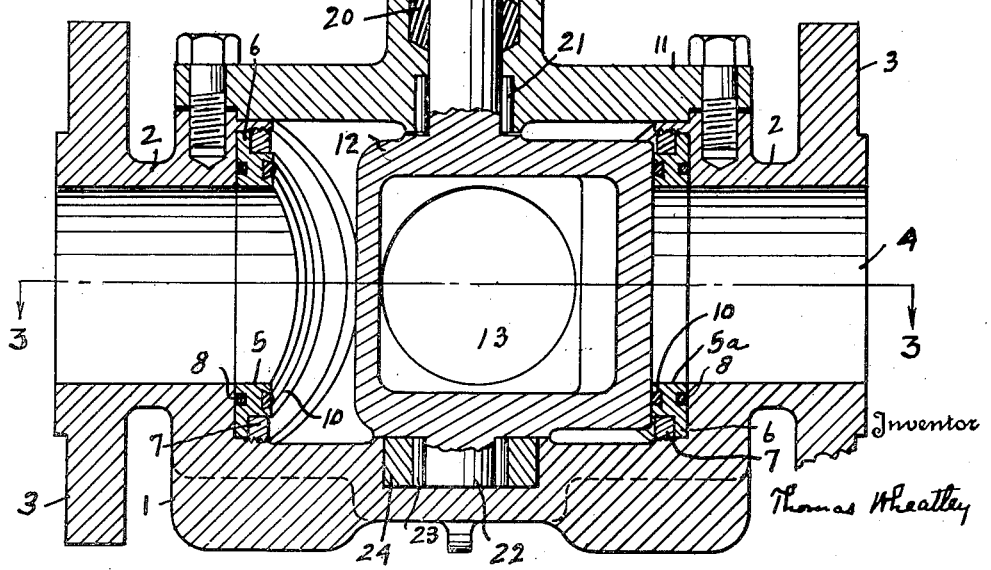
Inventor
Thomas Wheatley
E. V. Hardway.
ATTORNEY.

Nov. 6, 1951 T. WHEATLEY 2,574,428
VALVE ASSEMBLY
Filed Nov. 15, 1948 2 SHEETS—SHEET 2

Inventor
Thomas Wheatley
By
E. V. Hardway.
ATTORNEY.

Patented Nov. 6, 1951

2,574,428

UNITED STATES PATENT OFFICE 2,574,428

VALVE ASSEMBLY

Thomas Wheatley, Houston, Tex.

Application November 15, 1948, Serial No. 60,104

2 Claims. (Cl. 251—91)

This invention relates to a valve assembly.

An object of the invention is to provide an assembly of the character described specially designed for connection into a flow line and having oppositely disposed seats with a valve mounted in the valve casing which is readily adjustable so that it may co-operate with either of said seats to close the flow line to prevent the passage of fluid therethrough.

It is another object of the present invention to provide, in an assembly of the character described, a valve which is so mounted that the amount of friction and wear between the valve and seat will be reduced to a minimum so as to reduce the wear on the co-operating parts.

It is a further object of the present invention to provide an assembly of the character described wherein the faces of the valve seats which co-operate with the valve are located inwardly of the inner surface of the casing so as to give the valve ample clearance and so as to increase the volume of the interior of the casing relative to the flowway in order that the obstruction to the fluid flowing through the valve assembly will be reduced to a minimum.

A further object of the invention resides in the provision of a valve that may be readily adjusted in the casing so that it will co-operate with a selected seat.

Other objects and advantages will be apparent from the following specification which is illustrated by the accompanying drawings, wherein:

Figure 1 is a longitudinal, sectional view of the assembly.

Figure 2 is a elevational view.

Figure 3:
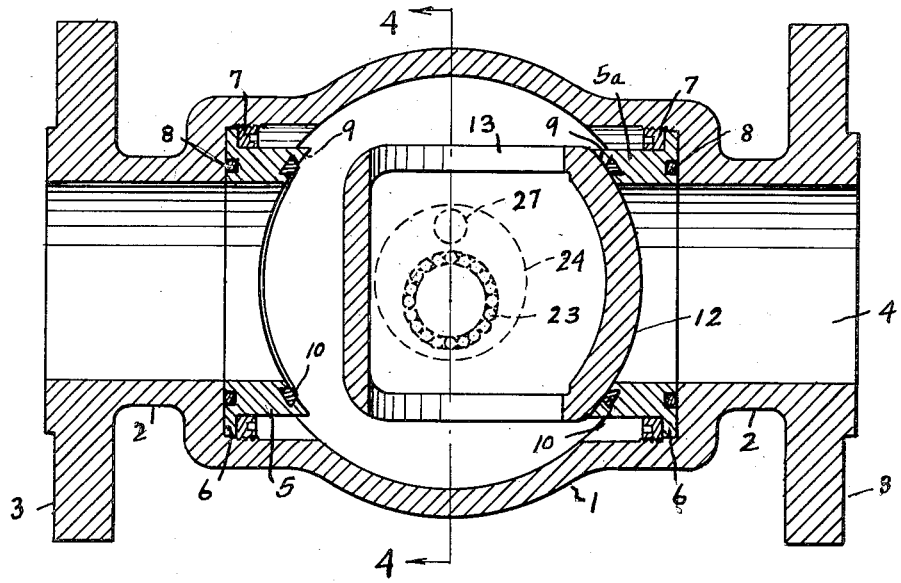
Figure 3 is a longitudinal, sectional view taken on the line 3—3 of Figure 1.

Referring now more particularly to the drawings, the numeral 1 designates the valve casing which is preferably of a general cylindrical shape, as indicated in Figure 3, and which has tubular end extensions 2, 2 provided with flanges 3, 3 for connection into a flow line.

However, it is to be understood that the assembly may be connected into the line in any preferred manner.

The casing is provided with a flowway 4 therethrough which aligns with the flowway through the line into which the casing is connected.

Around the flowway on each side there are the valve seats 5, 5a which are countersunk into the casing and which have the external outer end flanges 6, 6.

Ring nuts 7, 7 are screwed into said countersunk portions and clamp against the flanges 6.

The joints between the seats and the casing may be sealed by O-rings 8, 8 which are seated in grooves in the respective seats.

The inner ends of the valve seats are formed with seating faces 9, 9 in which suitable resilient seal rings 10, 10 are countersunk.

Attention is here called to the fact that the seating faces 9 are spaced inwardly beyond the inside wall of the casing 1.

The valve casing is preferably formed integrally except at one side which is provided with a removable cap plate, or cover, 11 which is suitably secured to the remaining portion of the casing.

Within the casing there is a valve 12 which may be cast, or otherwise formed, hollow. This valve has a flowway 13 therethrough of substantially the same transverse diameter as that of the flowway 4 and the valve is turnable to bring said flowways into and out of registration. As illustrated the flowways are out of registration and the valve assembly is closed. The valve has a stem 14 whose outer end is provided with a hand wheel 15 which is loosely mounted thereon and which in the present illustration is provided with radial spokes 16.

There is an impact member 17 mounted on the outer end of the stem 14 and turnable therewith. This impact member is provided with a radial arm 18 having an upstanding boss 19 which projects outwardly between the spokes 16 so that the hand wheel may be given partial rotations causing a spoke to strike the impact member to drive the valve to a securely seated position or to unseat the valve as desired.

The stem 14 works through a conventional stuffing box 20 in the cap plate 11 and is also mounted to rotate on antifriction bearings 21 in said cap plate.

On the opposite side of the valve from the stem 14 there is a pin 22 which is in alignment with said stem. This pin works in an adjustable bearing having antifriction means 23 therein around the pin. This bearing is located eccentrically of a circular bearing ring 24 which is seated in a circular recess 25 in the valve casing. The recess 25 has the sockets 26, 26 at its bottom. These sockets are oppositely disposed and are located on a line extending transversely with respect to the longitudinal axis of the flowway 4.

Extending through the bearing ring 24 there is a pin 27 which extends into one or the other of the sockets 26, as selected. When the ring 24 is held in one position by the pin 27 the bearing will be off center but will be located on said transverse line and when said ring is given a half turn so that the pin 27 would extend into the other socket 26 the center of rotation of the valve will be on said transverse line but on the opposite side of the longitudinal central line through the valve casing and seats.

Figure 4:
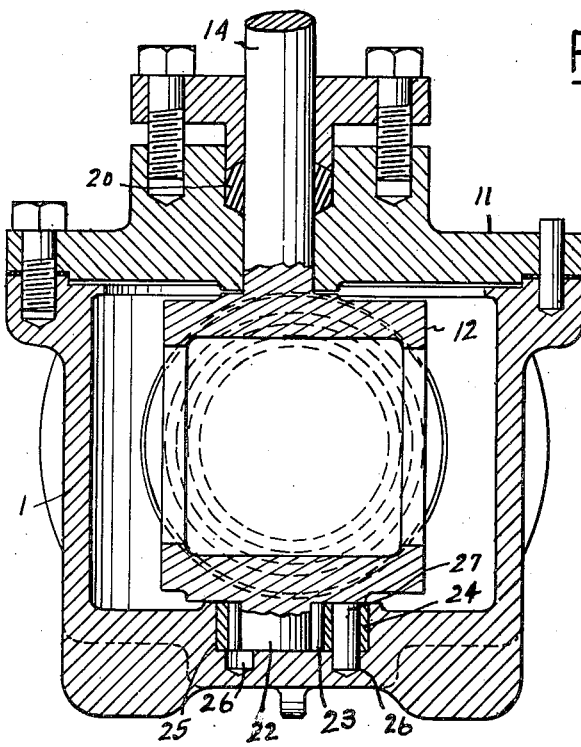
Figure 4 is a cross-sectional view taken on the line 4—4 of Figure 3.

When arranged, as illustrated in Figure 3, the valve, when closed, will seat against the face of the seat 5a but if it be desired to cause the valve to seat in the other direction and against the face of the seat 5 the ring 24 may be given a half turn to accomplish this purpose. The stuffing box 20 and bearings 21 on the cap plate are positioned off center, and located on a line extending transversely with respect to the longitudinal axis of the flow way 4, as seen in Figure 4, so that when the ring 24 is turned as described above, the cap plate can be removed and given a half turn, to bring the stem into alignment with the pin 22, when it is desired to operate the valve in cooperation with the valve seat 5 instead of with the valve seat 52a.

It will be noted that the outer face of the valve 12 is outwardly curved, as more accurately shown in Figure 3, and the seating face of each seat is correspondingly curved and said seating faces are concentric with the ring 24 but said outwardly curved face of the valve is eccentric with respect to the seating faces of the seats so that as the valve moves to closed position it will clear the corresponding seating face of the valve seat until it is in position to seat against said seating face thus eliminating much friction between said parts and, on the other hand, as the valve is turned to open position upon initial movement it will move away from and clear the seating face of the corresponding seat so as likewise to minimize the friction between the cooperating parts upon opening movement of the valve. Therefore the pressure of the valve against the seat faces will be mainly a direct pressure and this will greatly prolong the life of the valve seat and particularly the seal rings 10 forming part of said seats.

The drawings and description are illustrative.

What I claim is:

1. A valve assembly comprising, a casing having a flowway therethrough, annular valve seats mounted in the casing around the flowway and spaced apart and having annular curved seating faces, a valve mounted in the casing to rotate about an axis which is approximately perpendicular to the axis of said seats, said valve having an external curved face, means for shifting the valve axis to positions eccentric with respect to the respective seats said means comprising an operating stem on said valve, a cap plate, securing means cooperable with said cap plate and said casing for retaining said cap plate in one of several alternative positions on said casing, said cap plate having an opening for the passage therethrough of said stem, said opening being positioned eccentric with respect to said axis of said valve seats, a pin extending from said valve opposite said stem, and bearing means moveably disposed in said casing for cooperation with said pin to maintain said pin eccentric with relation to said axis of said valve seats, said valve face being movable, upon turning movement of the valve, into contact with one of said seat faces when the valve is in one of said positions and being movable into contact with the other seat face when the valve is shifted to said other position.

2. A valve assembly comprising, a casing having a flowway therethrough, annular valve seats mounted in the casing around the flowway and spaced apart and having annular curved seating faces, a valve between said seats and adapted to be positioned to rotate about one of two axes each of which is approximately perpendicular to the axis of said seats and eccentric with relation to one of said seating surfaces, said valve having an external curved face, means for positioning said valve for rotation on either of said axes, said means comprising a valve stem on said valve, a cap plate adjustably secured to said casing and having an opening for the passage therethrough of said stem, said opening being positioned for centering on either of said axes, a pin extending from said valve opposite said stem, and bearing means cooperable with said pin and rotatably carried in said casing, said bearing means being moveable to positions to center said pin on either of said axes, and means interengageable with said bearing means and said casing in either of said positions of said bearing means to hold said bearing means against rotation relative to the casing.

THOMAS WHEATLEY.

REFERENCES CITED

The following references are of record in the file of this patent:

UNITED STATES PATENTS

| Number | Name | Date |
|---|---|---|
| 1,442,452 | Taylor | Jan. 16, 1923 |
| 1,989,009 | Heggem | Jan. 22, 1935 |
| 2,034,216 | Stout | Mar. 17, 1936 |
| 2,306,839 | Volpin | Dec. 29, 1942 |

FOREIGN PATENTS

| Number | Country | Date |
|---|---|---|
| 554,267 | France | of 1923 |